Sept. 18, 1951  H. E. LONNGREN  2,568,239
ART OF TREATING BLACK LIQUORS
Filed March 29, 1949
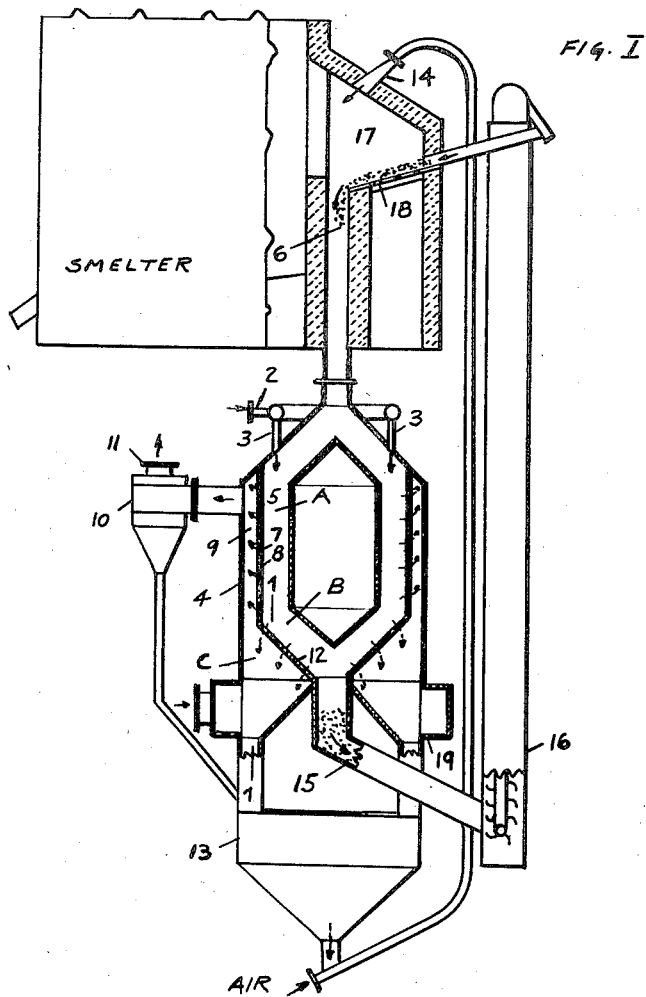
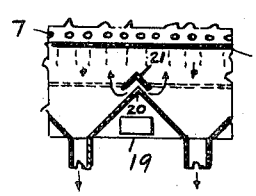
INVENTOR.

Patented Sept. 18, 1951

2,568,239

UNITED STATES PATENT OFFICE 2,568,239

ART OF TREATING BLACK LIQUORS

Harald E. Lonngren, New York, N. Y.

Application March 29, 1949, Serial No. 84,237

2 Claims. (Cl. 202—14)

My invention relates to the art of treating black liquor. More particularly my invention relates to the continuous process of evaporating the water content of a relatively wet mass of black liquor to produce a dry residue powder which is suitable for use in a soda ash recovery operation.

It is a primary object of my invention to reduce by simple and complete distillation, a so called black liquor containing about 50 per cent water under such conditions of feed rate of such black liquid to a drying zone, temperature of said liquor as fed to said zone, and temperature and amount of a moving mass of granular refractory material or other material in pebble form fed to the drying zone as carrier of the required heat in said drying zone, to produce a frangible residue, which residue when broken up may easily be removed from the said drying zone for use in a soda ash recovery operation.

It is a second object of my invention to thermally treat black liquor having a water content of say 50 per cent, under certain conditions, hereinafter fully explained, in a drum or chamber, in which treatment the vaporized water is removed from the drum or chamber immediately following its liberation from the black substance.

Other and further objects will hereinafter appear from the ensuing description and claims.

I appreciate that the prior art contains numerous patents and publications relating to the process of preparing black liquid for soda ash recovery purpose. In so far as I am aware, however, there is no prior disclosure, nor does any prior research anticipate the real substance of my invention, which, as stated, relates primarily to a process in which I have discovered the range of conditions for carrying out the process to secure the results indicated hereinbefore. One of the outstanding advantages of my process over any prior work with which I am familiar, resides in the possibility of producing a dry black substance which is not sticky, but rather is granular and porous and lends itself readily for combustion in suspension with air. Approximately 15 to 25 per cent of the combustibles in the black substance adheres to the granules of the heat carrier. When this deposit is burned off in a regenerating zone or oven a sufficient amount of heat for the entire drying process is imparted to the heat carrying medium itself. This represents an important advance in the art because such adherent material is actually an aid in the process rather than a barrier as the case is in methods heretofore in use. It is pointed out that an important feature of my invention resides in the withdrawal from the system of liberated steam. It is well known to those skilled in the art that such steam can advantageously be used elsewhere in a sulphate cellulose mill. I have found that the soda ash recovery step proper in a smelter and particularly in the combustion chamber thereof is greatly facilitated because of the absence of steam. Steam—when present in said step—fosters the formation of a sticky char which clings to the walls of the smelter and hinders an even supply of the black substance into the smelter mass. It is also very difficult to properly burn such char formations and it is not uncommon that such formations take on large proportions before they finally break loose and drop down into the smelter mass wherein of a consequence they upset proper equilibrium conditions. By removing all formed steam in my process it is possible to create smelter furnace conditions which are more suitable for an expeditious union between carbon and oxygen. There is thus no steam to hinder this union and the result is that no char is formed. This again results in a soda ash recovery system of a truly continuous and uniform nature.

Approximately 50 per cent dry black liquor can be reduced to a dry substance in many ways. In all previous disclosures the required heat is derived from the process itself in an indirect manner and the final substance may contain up to 10 per cent moisture. It is specifically pointed out that I use heat which is imparted to a carrier in a direct way and which heat is also given up by the said carrier in a direct way. The black substance is prevented from forming a solid mass while undergoing complete drying by the pebble shaped heat carrier. In this manner no steam can be trapped and the substance becomes a dry easily flowing powder. Herein resides another important advantage of my process which in combination with a slight grinding effect by the pebbles themselves lends the dried substance suitable for conveyance by a stream of air.

My invention is fully disclosed in this specification and claims, reference being had to the accompanying drawing.

In the accompanying drawing Fig. I represents diagrammatically and in partial vertical section, one form of apparatus in which my invention may be performed and comprises essentially an oven-like extension to the smelter furnace adapted to impart heat to the refractory pebble heat carrier circulating therethrough continuously, means to effect the circulation of the heat carrier, an elongated vertical drum comprising a confined space wherein said heat carrier is brought into direct contact with the black liquor feed, means to feed said black liquor into said drum, means to pass the heat carrier to said drum and away from it and means to withdraw formed steam immediately following its liberation in said drum from one end thereof and a dried black substance from the other end, all of which features and others will more fully and at large appear from the following detailed description. In Fig. II, a partial sectional view taken along line I—I of Fig. I is illustrated, and it will be noted that heated air is introduced to the system countercurrently to the dropping dried substance.

Referring in detail to Fig. I, a preheated feed comprising a black liquor having a water content of about 45 to 50 per cent by weight is introduced into the system through line 2 which connects to nozzles 3, 3 located as shown in the upper portion of a drying drum 4 from which nozzles the black liquor emerges as downward directed sprays into an annular space 5 in said drum. The black liquor is fed into the drum at a rate such that about ¼ to ⅛ of its calorific heat value per pound will cause an instantaneous evaporation of one pound of water therein. This rate is approximately such that if the black liquor were at atmospheric temperature it would amount to about 2 to 10 volumes of cold liquor per volume of the annular space 5 per hour. At the same time, a moving mass of hot refractory pebbles 6 of about one half to one inch in diameter is conducted downwardly through said annular space at a rate equalling about 3 to 10 times the black liquor feed. The temperature of said pebbles is about 1000 to 1500 deg. F. Upon direct contact between said pebbles and said black liquor feed the water content of said feed is evaporated. The formed steam is withdrawn from said annular space immediately following its liberation through apertures 7 in the outer envelope 8 of said annular space. The steam is collected in a jacket 9 of the drying drum 4 and is conducted through a cyclone 10 per discharge to other channels (not shown) through opening 11. The refractory pebbles preoccupy the annular space 5 and cause a porous black mass to exist therein. In this manner steam can not be trapped in the black mass. This mass is further heated by the pebbles after all the steam has been driven off. This additional heating to a dry powder raises the temperature of the black substance appreciably above the temperature otherwise possible inasmuch as the black mass such as described above is heated to high temperature with some difficulty due to the tendency of such a mass to deposit a sticky char in a heating coil or drum. For example, the temperature of the pebble mass may be 1500 deg. F. and the temperature of the black liquor feed say 200 deg. F. steam is driven off above the 212 deg. F. level. The required heat for this evaporation is supplied by the pebbles and it will be seen that by using a pebble mass in excess of the minimum required to effect this evaporation alone sufficient heat will be available for raising the temperature of the moisture free black mass above the 212 deg. F. level, that is, to guarantee a perfectly dry mass. Of course, the time of contact enters into the picture. I have found that when this time element is about 2 to 5 seconds and the ratio between the black liquor feed and the pebble mass feed is in the order of ⅓ to 1/10 the black liquor will be reduced to a dry powder without difficulty. The annular space wherein the transfer of heat takes place should be sufficiently elongated to permit an adequate period of time of residence of the two media therein to effect complete aeration or removal of the liberated steam. A sticky char is, of course, momentarily also formed in my system. The ill effects from this formation are not materially felt, however, in my process. This is due to the grinding action between the refractory pebbles themselves and between the pebbles and the walls of the annular space. Adherent char is scrubbed off to such an extent that only about 15 to 25 per cent of the black mass is carried away with the pebbles. The drum 4 may be considered, for purposes of illustration, to consist of three zones, A, B and C, the zone A representing a distillation zone, the zone B representing a stripping or drying zone, and the zone C representing an aeration or vapor disengaging zone, that is, a zone wherein the formed steam is permitted to disengage for withdrawal purpose. In the zone A, pockets of steam momentarily entrained in the partly distilled black mass settle or fall down to the stripping and drying zone B wherein by virtue of the agitation by the pebbles and further heating the steam is stripped and freed from the black mass. The dried mass drops down to zone C through a grating 12 disposed at the bottom of zone B and is collected in a hopper-like portion 13 wherefrom it is conveyed in suspension with air to burner 14. The pebble mass does not pass through the grating 12 and is conveyed out from the drum 4 through conduit 15 at the end portion of which an elevator 16 picks up the pebble mass and discharges it into the oven 17. Herein the adherent combustibles are burned off upon a grate 18. The liberated heat is absorbed by the pebbles themselves which thus in a heated condition are conveyed into the drying drum 4. This cycle is continuous.

An alternative mode of operation is to blow preheated air into the dried mass as it drops through grating 12 for the specific purpose of removing every trace of steam which eventually is still trapped in the black mass. Fig. II illustrates this feature and it will be seen that such air is conducted from some source (not shown) into a plenum chamber 19 wherefrom it emerges through a multiplicity of apertures 20 in the form of jets against the dropping black mass in the zone C. Deflector plates 21 prevent said apertures from being clogged up. The air thus used for aeration leaves the system together with the steam.

While the above concrete example set forth in conjunction with the mode of operation of the apparatus of Fig. I represents the preferred modification of my invention as to operating conditions, it should be pointed out that other good operating conditions—while varying with the character of the charge stock—generally fall within the following range:

Item 1.—Pebble to black liquor feed rate (by weight) 10 to 20.

Item 2.—Pebble preheat temperature, deg. F. 1400 to 1800.

Item 3.—Wet black liquor contact time, seconds .5 to 10.

Item 4.—Process pressure partial vacuum to 1 lb. per sq. in.

It is pointed out that the operation of my process of treating black liquor is very flexible with respect to the consistency and temperature of the charge stock. For example, a 55 per cent dry stock can be handled just as easily as a 50 per cent dry one of the same temperature by changing the speed of the elevator so as to allow for a longer contact time. An auxiliary booster burner (not shown) may also be used to impart additional heat to the pebble mass in the oven. Furthermore a simple means (not shown) may be employed to divert a greater portion of dried substance to accompany the discharge pebble mass from the drying drum.

It will be understood that numerous modifications of the invention may be made without departing from the spirit thereof, and the said invention is not limited to the precise details hereinbefore enumerated (but is to be construed as broadly as the appended claims will permit.)

What I claim is:

1. The process of treating black liquor which comprises: providing a distillation zone having a downwardly moving bed of refractory pebbles therein; continuously feeding pebbles at a temperature between 1000 and 1800° F. to the top of said bed; continuously spraying black liquor feed containing about 50% solids and at a temperature of 200° F. onto the top of said bed; passing the liquor and pebbles concurrently downward through the distillation zone; while the heat in said pebbles acts to dry the black liquor into a frangible solid; removing vaporous products from the distillation zone; removing the dried black liquor from the bottom of the distillation zone; removing the refractory pebbles from the bottom of the distillation zone; passing the dried black liquor and the refractory pebbles separately into a combustion zone; combusting the dried black liquor and simultaneously combusting any dried black liquor adhering to the refractory pebbles, the heat of combustion heating the pebbles; and recycling the heated pebbles to the distillation zone as the pebble feed thereto.

2. The method set forth in claim 1, in which heated air is added to the zone in order to absorb moisture from the distilled substance.

HARALD E. LONNGREN.

REFERENCES CITED

The following references are of record in the file of this patent:

UNITED STATES PATENTS

| Number | Name | Date |
|---|---|---|
| 1,698,345 | Puening | Jan. 8, 1929 |
| 1,825,374 | Thiele | Sept. 29, 1931 |
| 1,931,536 | Goodall | Oct. 24, 1933 |
| 2,213,052 | Rosencrants et al. | Aug. 27, 1940 |
| 2,412,667 | Arveson | Dec. 17, 1946 |
| 2,494,695 | Fisher | Jan. 17, 1950 |

OTHER REFERENCES

Norton: "Pebbles Heater"; Chem. & Met. Eng., July 1936, pages 116–119. Copy in Library.